(No Model.)
J. THOMSON.
CLUTCH.
No. 296,892. Patented Apr. 15, 1884.
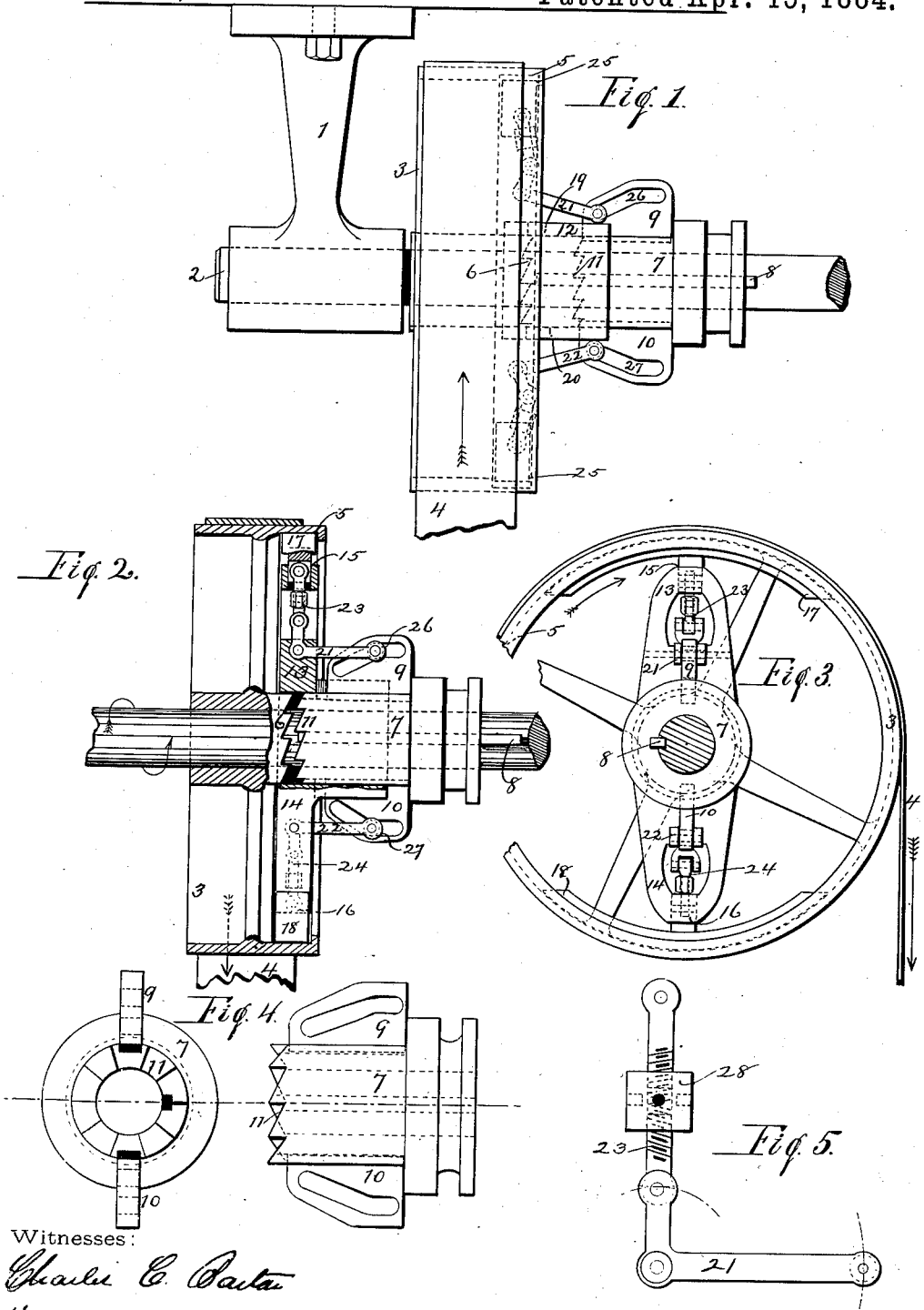
Witnesses:
Charles C. Baxter
Herman T. C. Kraus
Inventor:
John Thomson

UNITED STATES PATENT OFFICE.

JOHN THOMSON, OF BROOKLYN, NEW YORK.

CLUTCH.

SPECIFICATION forming part of Letters Patent No. 296,892, dated April 15, 1884.

Application filed July 25, 1883. (No model.)

*To all whom it may concern:*

Be it known that I, JOHN THOMSON, a citizen of the United States, residing in Brooklyn, county of Kings, and State of New York, have invented certain new and useful Improvements in Clutches, of which the following is a specification.

My invention relates to clutches. The object of my invention is to produce a positive claw-clutch operative by a single continuous movement, and which shall effect, practically, an instantaneous engagement without shock or jar to the driven mechanism. This device, as will be shown herein, aims to start the driven mechanism from a state of rest to high motion in the quickest possible instant not destructive or objectionable. It follows, therefore, that the friction developed for starting the driven mechanism should be applied in a highly cumulative ratio, that the device as a whole should be easily and quickly operated, and also that means for adjusting for varying duties should be convenient to make and ample in scope. In developing the starting friction I have preferably made a combined use of the inclined plane, the lever, and the toggle, all operated by a single thrust of a keyed sleeve, the conditions of operation being as follows: first, the development of sufficient friction to promptly start the driven mechanism from a state of rest; second, a momentary maintenance of the friction; third, the positive engagement of the claws.

Figure 1 of the drawings is an upright front elevation of my invention, shown as applied to shafting. Fig. 2 is an upright central sectional view; Fig. 3, an upright end elevation as viewed from the right-hand side of Fig. 1. Fig. 4 is a detached side and end view of sleeve, and Fig. 5 a detached view of toggle and lever.

In the drawings, 1 is a shaft-support; 2, a shaft; 3, a pulley, and 4 a driving-belt.

Under the conditions shown in Fig. 1 the pulley revolves loosely upon the shaft, and is otherwise like any ordinary loose pulley, except that the inner surface of the rim on one side of the arms of the pulley is turned out to form a continuous groove or recess, as 5, and also that on one side of the hub of said pulley is formed a series of claws or teeth, 6.

On the shaft is a freely-fitting sleeve, 7, secured against rotation by the key or feather 8, but free to be moved longitudinally through the medium of any convenient shipping device operating within the groove formed in the hub of said sleeve.

Diametrically opposite from each other, but secured to or formed from the sleeve, are two cams, 9 10.

Upon the face of the sleeve nearest to the pulley is formed a series of claws or teeth, 11, adapted to engage with the claws 6, formed in the hub of the pulley.

Passing over and around the sleeve is a false hub, 12, from which radiate two arms, 13 14, at the ends of which are bearings 15 16, in which are carried two segments, 17 18, formed to the same arc as that of the groove in the pulley within which the said segments operate. In the false hub 12 are two slots, 19 20, within and from which project the cams 9 10. Thus the segments, the arms, and the false hub are in effect keyed to the sleeve 7, while within limitations the sleeve is free to be slid longitudinally in or out within the false hub, and also upon the shaft, the depth of the groove in the pulley preventing the segments from being drawn with the sleeve.

Attached to the arms and segments are a pair of bell-cranks, 21 22, and toggle-connections 23 24. Said bell-cranks are respectively connected at their shorter leverage to the toggles and at their longer leverage to the cams. As shown, the cams 9 10 present to the levers operating within them an inclined plane and a slotted terminus.

The operation is as follows: In Fig. 1 the sleeve 7 (shown as having been withdrawn from the pulley) has carried the levers inward toward the shaft, while the bell-cranks, in turn acting upon the toggles, have also carried the segments inward, as at 25, thus entirely relieving the pulley, which may rotate freely upon the shaft. In Fig. 2 the conditions are shown as reversed. The sleeve, having been thrust partially forward, has carried the levers outward, bringing the toggles to a straight line, and hence forcing the segments with great pressure against the outer wall of the groove in the pulley. The pulley, meantime, exactly in the ratio of the friction developed, will have been acting to drive the shaft, through the impact of the segments, to the arms, to the sides of the cams and sleeve, and finally to the key 8 and the shaft. Beyond this part of the forward thrust of the sleeve there will be no further increase of friction upon the segments in consequence of the termination of the inclined planes of the cams, as at 26 27. It will also be seen that at this point the entire strain developed by the action imparted to the levers is borne by the toggles, thus relieving the sleeve of all friction except that against the side of the key. At this part of the longitudinal movement of the sleeve, it being assumed that the friction developed upon the surfaces of the segments has been sufficient to overcome the inertia of the driven mechanism, the rotative speed of the pulley and the sleeve will be nearly or quite equal, when the further effect of the now comparatively easy or relieved movement of the sleeve toward the pulley is simply to place the two sets of claws into positive engagement with each other, and the pulley will then drive through the sleeve and key direct.

In order to effect such a frictional development as shall produce the best results from the action of the segments under varying conditions and duties, and also to "take up" for wear of parts, I form the toggles of two parts, Fig. 5, the ends of which are threaded, respectively, right and left, and are connected by a single nut, 28, also having a right and left hand thread. Thus by properly turning the nut the length of the toggle is increased or decreased, and the proper throw of the segments thereby determined. The faces of the segments should preferably be covered with yielding material having a high coefficient of friction, as paper, rubber, leather, &c.

The preferable relative time for locking the claws is when the speed of the driven nearly equals the driving mechanism, as should the highest points of each set of claws happen to meet the speeds, being slightly differential, would thereby cause the claws to slip past each other into engagement.

As shown, the combination of the toggle, the lever, and the inclined plane gives a very powerful pressure upon the segments, while in addition thereto increased leverage might still be added to the lever of the "shipping" apparatus. While the movement in shipping this device is continuous and quickly performed, there is an inequality in the resistance presented which is of advantage, in that the temporary check of the inclined plane and the following relief of the slot in the cam affords the instant of time required in the majority of cases for overcoming the inertia of the driven mechanism through the medium of the friction-segments.

As will readily be seen, that portion of the longitudinal movement of the sleeve for effecting the final engagement of the claws may be relatively short or long, as required by varying conditions, as in starting a heavy line-shaft with numerous belts, when the slip of the segments would be greater and the space traversed in making the final positive engagement longer, or as in light lathes, paper-cutting machines, stamping-presses, &c., in which the application of the friction and final positive engagement of the claws are made at practically the same time.

What I claim is—

1. The combination, with a pulley, of a locking-clutch, the construction being such that the clutch will operate by a continuous movement of the sleeve, first, to impart the motion of the driving to the driven mechanism by means of friction; second, to then relieve the sleeve from the strain developed by the friction devices; third, to momentarily maintain and drive the driven mechanism by the friction thus developed, and, fourth, to finally directly and positively engage the sleeve and the pulley, substantially as described.

2. The combination, with a pulley having teeth or claws, of a clutch-sleeve provided with cam-slots and teeth or claws, and friction devices connected with the sleeve, the arrangement being such that the frictional devices are operated to engage with the pulley, and the teeth or claws upon the sleeve and pulley are then caused to positively engage, whereby a direct and practically instantaneous engagement is effected without shock or jar.

3. The combination, with a pulley and friction and locking devices, of a sleeve having cam-slots and claws or teeth, substantially as shown, the arrangement being such that by the continuous movement of the shipping-gear the friction devices are first caused to gradually engage by impact with the pulley, and then to positively and directly connect the sleeve with the pulley, substantially as described.

4. The combination, with a pulley, friction-segments engaging therewith, toggles connected to the friction-segments, and levers connected with the toggles, of a sleeve provided with slots, whereby, upon the movement of the sleeve, the friction-segments are caused to engage with a constantly-increasing force until the said toggles are brought to a straight line, when the sleeve is released from the resistance of the friction devices, and is free to be slid into direct and positive engagement with the pulley.

5. The combination, with a pulley having claws or teeth, friction-segments engaging therewith, and toggle-levers connected with the segments, of a clutch and locking-sleeve having the cam-slots, substantially as shown; engaging with the levers, the arrangement being such that upon the continuous movement of the sleeve the friction-segments are caused to engage with the pulley with a constantly-increasing force, and when the maximum is reached such force is maintained by the toggles, and the sleeve is relieved and free to be locked in direct engagement with the teeth on the pulley, substantially as described.

6. In combination, the pulley 3, friction-segments 17 18, arms 13 14, toggles 23 24, bell-cranks 21 22, cams 9 10, sleeve 7, claws 6 11, and shaft 2, for the purpose herein set forth.

7. The combination, with a pulley having teeth or claws, of a clutch-sleeve provided with cam-slots, teeth or claws, and frictional devices connected with the sleeve, the arrangement being such that the frictional devices are operated to engage with the pulley, and the teeth or claws are then caused to positively engage, whereby a practically-instantaneous engagement is effected between the pulley and clutch without shock or jar.

8. The combination, with a pulley, friction-segments engaging therewith, toggles connected to the friction-segments, levers connected with the toggles, and a sleeve provided with inclined slots, whereby, upon the movement of the sleeve, the friction-segments are caused to engage with the pulley with a constantly-increasing force, substantially as described.

9. The combination, with a pulley having claws or teeth, friction-segments engaging therewith, toggle-levers connected with the segments, and a clutch and locking-sleeve having the inclined cam-slots, substantially as shown, engaging with the levers, the arrangement being such that upon the continuous movement of the sleeve the friction-segments are caused to engage with the pulley with a constantly-increasing force, and when the maximum is reached such force is maintained and the sleeve locked in engagement with the teeth on the pulley, substantially as described.

JOHN THOMSON.

Witnesses:
 JAMES WHITFORD,
 LYMAN H. ESSEX.